April 19, 1955     J. NOWAK     2,706,511
WHEEL RIM
Filed April 27, 1950
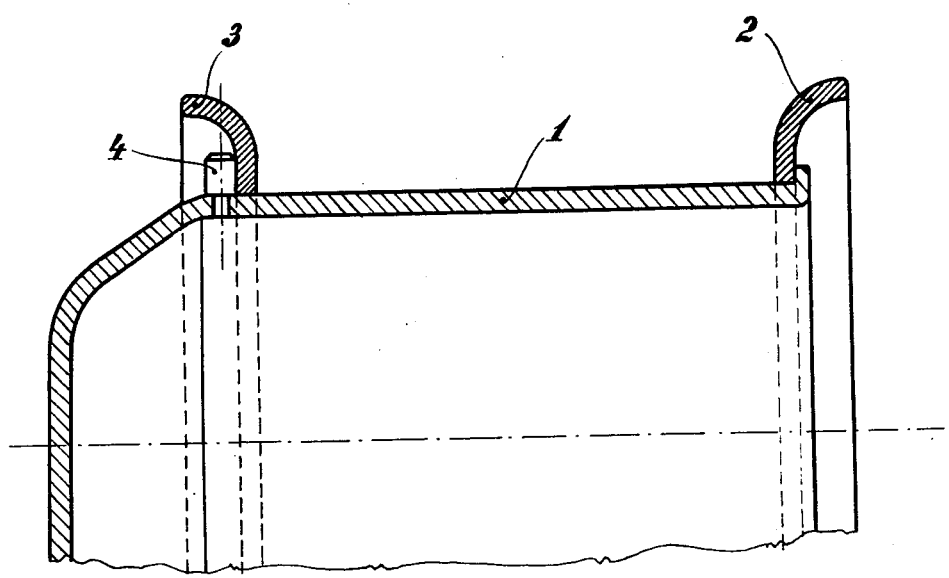
Inventor
JOSEFA NOWAK
By Richard Guy
Agent

United States Patent Office 2,706,511
Patented Apr. 19, 1955

2,706,511
WHEEL RIM

Josefa Nowak, Vienna, Austria

Application April 27, 1950, Serial No. 158,529

Claims priority, application Austria May 23, 1949

1 Claim. (Cl. 152—405)

The usual flat bottom rims are made of two, three, or four parts, and generally consist of a rim body, lateral rings, and a locking ring.

All these constructions, however, have one feature in common, viz. that an assembly of the rim parts is only possible if either one of the lateral rings or the locking ring is slitted.

The obvious disadvantage of these rings consists in the fact that it is impossible to ascertain whether the slitted ring, lateral or locking, is reliably seated in the respective rim body groove. If this is not the case, the ring will be pushed out of the groove, due to the lateral pressure of the tire during inflation, and forcibly separated from the rim body. This danger is perfectly eliminated by means of the wheel rim of the invention.

The drawing shows, by way of example, a fragmentary sectional view of a wheel rim embodying features of the invention, the section being taken through the axis.

The rim band 1 carries two slidable lateral rings 2 and 3. The ring 2 bears against an offset edge portion of the rim band, whereas the lateral displacement of the ring 3 in the outward direction is limited by a number of bolts 4. These plain or threaded bolts are received in bores in the rim band, and are prevented from falling out of their seats by the respective lateral ring which is shaped accordingly. In the inward direction, the lateral ring is held in place by the tire.

The rim parts are made of steel or light metal sheet form or in form of castings, whilst the bolts are made of steel or steel alloys.

What I claim is:

A rim for a tire comprising a rim band, two raised rings mounted around the outer face of said band to retain a tire, at least one of the rings being spacedly located inwardly of the adjacent edge of the rim band, the edge portion of the rim band outwardly of said ring being provided with circumferentially spaced holes, and bolts, each bolt including a head and a shank, the shanks being received in said holes and traversing the rim band, said heads bearing upon the outer face of the rim band and forming abutments for the adjacent ring to prevent outward movement, the bolt heads being of a diameter larger than that of the bolt shanks, said ring being bent outwardly into the form of a concave, when viewed in cross section, partly vaulting over the bolt heads.

References Cited in the file of this patent

UNITED STATES PATENTS

| | | |
|---|---|---|
| 779,731 | Neary | Jan. 10, 1905 |
| 802,600 | Salisbury | Oct. 24, 1905 |
| 1,077,282 | Kelley | Nov. 4, 1913 |
| 1,161,348 | Selzer | Nov. 23, 1915 |
| 1,203,648 | Overman | Nov. 7, 1916 |
| 1,430,698 | Stephenson | Oct. 3, 1922 |

FOREIGN PATENTS

| | | |
|---|---|---|
| 268,044 | Italy | Oct. 1, 1921 |
| 410,947 | France | Mar. 24, 1910 |
| 660,819 | France | Feb. 25, 1929 |
| 669,565 | France | Nov. 18, 1929 |